United States Patent Office 2,880,166
Patented Mar. 31, 1959

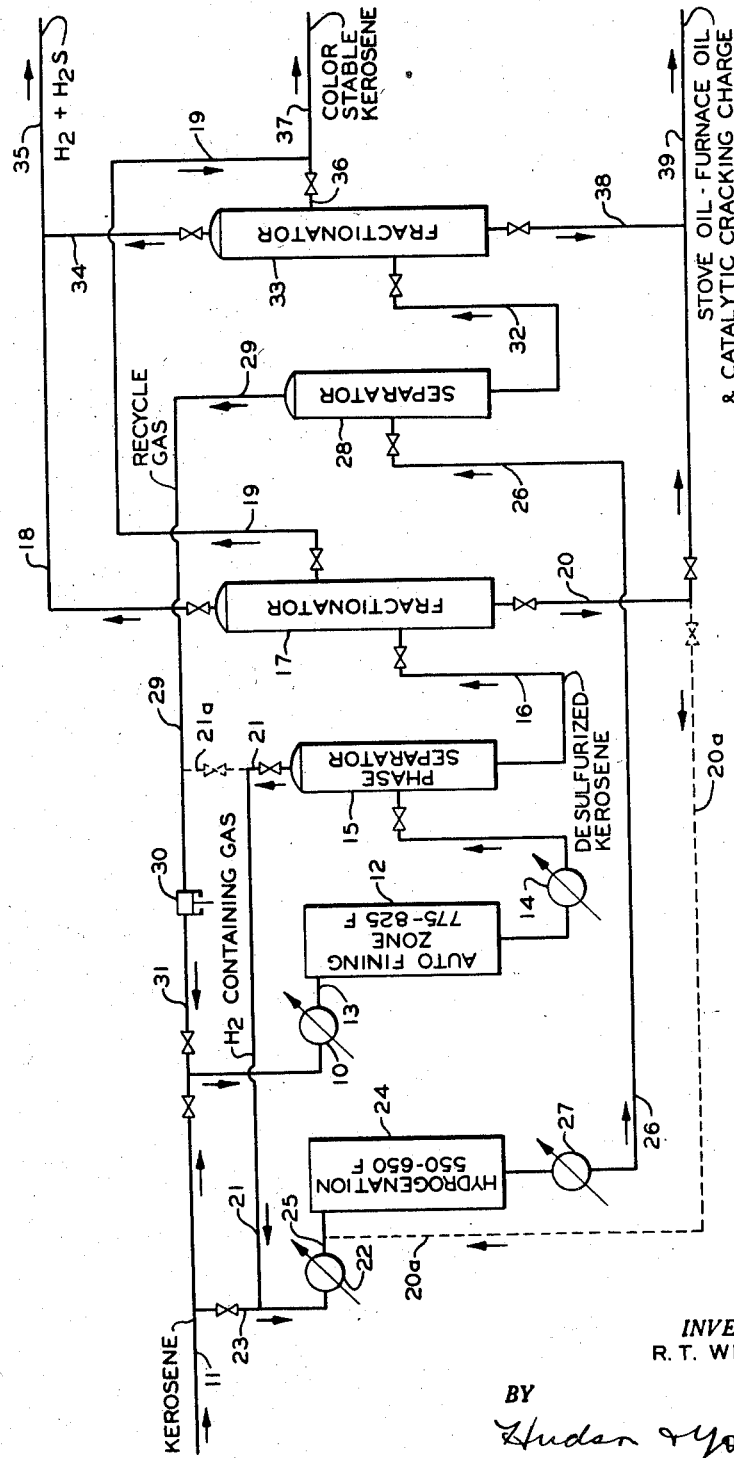

2,880,166

IMPROVING COLOR AND COLOR STABILITY OF KEROSENE BY COMBINED AUTOFINING AND HYDROFINING

Reagan T. Wilson, Bartlesville, Okla., assignor to Phillips Petroleum Company, a corporation of Delaware Application October 19, 1955, Serial No. 541,439

9 Claims. (Cl. 208—100)

This invention relates to a process for the improvement in color and color stability of hydrocarbons. In one aspect this invention relates to the improvement of color and color stability of hydrocarbon distillates by treating separate streams of such distillate in parallel, one under autofining conditions and the other under hydrogenation conditions, while withdrawing hydrogen from the said autofining and supplying the same as the sole source of hydrogen to the hydrogenation. In another aspect this invention relates to a method for improving color and color stability of hydrocarbon distillates boiling in the kerosene range by treating split streams of such hydrocarbons in parallel under autofining and hydrogenation conditions as above described and by fractionating effluent from each said step to produce desired high color quality product.

Autofining and conventional hydrogenation have been used in the art for effecting desulfurization of hydrocarbons. In autofining, a petroleum feed stock is contacted in a catalytic desulfurization zone in presence of a sulfur-resistant hydrogenation catalyst under suitable conditions of temperature and pressure such that sufficient hydrogen is produced by dehydrogenation of the naphthenic hydrocarbons contained in the feed stock to effect conversion of sulfur compounds contained therein into hydrogen sulfide. In the autofining of hydrocarbons boiling in the kerosene range, added hydrogen is not required, the process being operated to produce a net yield of hydrogen which can be used in other parts of the plant such as in other hydrogenation processes. Conventional hydrogenation involves direct reaction of hydrogen with sulfur in the presence of a sulfactive hydrogenation catalyst, generally under reaction conditions considerably milder than those of autofining.

I have discovered that color and color stability of hydrocarbon distillates can be markedly improved by treating separate or split streams of such hydrocarbon in parallel in a combination of autofining and hydrogenation steps wherein higher yields of high color quality product are obtained than are obtained by autofining alone, and overall operating conditions of less severity are utilized than when employing autofining, and wherein hydrogen from autofining is used as sole source of hydrogen for hydrogenation thereby providing for an equivalent of increased autofining yield of high color quality product.

An object of this invention is to provide for treatment of off-color hydrocarbons to improve their color and color stability. Another object is to provide a combination of autofining and hydrogenation steps for treating off-color hydrocarbons to improve their color and color stability. Another object is to provide a process for producing hydrocarbon naphthas boiling in the kerosene range of improved color and color stability from raw or off-color naphthas. Still another object is to provide a combination of hydrogenation and autofining steps with fractionation of effluent from each such step to produce product of improved color and color stability in yields and color quality higher than those from employing autofining alone and obtained under overall operating temperature conditions less severe than those utilized employing autofining. Other aspects and objects of this invention and its several related particulars are evident from a perusal of this disclosure, the drawings and the appended claims.

In accordance with this invention color and color stability of off-color sulfur-bearing hydrocarbons are improved by autofining a first stream of such hydrocarbons, hydrogenating a second stream of such hydrocarbons, recovering hydrogen from effluent of the said autofining and passing same to the said hydrogenation as sole source of hydrogen therefor, and recovering hydrocarbons of improved color and color stability from effluent of the hydrogenation and outfining steps; the invention in accordance with one concept providing for passing a first stream of such an off-color sulfur-bearing hydrocarbon distillate, boiling in the kerosene range, into contact with an autofining catalyst under autofining conditions, passing a second stream of such distillate boiling in the kerosene range in contact with a hydrogenation catalyst under hydrogenation conditions, recovering hydrogen from effluent from the said autofining and passing same to the hydrogenation as sole source of hydrogen therefor, and recovering hydrocarbon distillate of improved color and color stability from effluents of the said hydrogenation and autofining; the invention in accordance with still another concept providing for passing a first stream of an off-color sulfur-bearing kerosene into contact with an autofining catalyst under autofining conditions, passing a second stream of the second kerosene in contact with a hydrogenation catalyst under hydrogenation conditions, recovering hydrogen from effluent of the autofining and passing same to the hydrogenation as sole source of hydrogen therefor, fractionating effluent from the said autofining to produce the said hydrogen supplied to the hydrogenation and a residual liquid fraction and fractionating effluent from the said hydrogenation into a hydrogen-containing fraction and a residual liquid fraction, fractionating residual liquid from said autofining to produce an intermediate fraction of from 70 to 85 percent of its volume and fractionating residual liquid recovered from said hydrogenation to produce up to 95 percent of its volume of an intermediate fraction, and recovering each of the said intermediate fractions as improved product of the process.

The autofining step of this invention is carried out under conventional autofining conditions, generally in vapor phase, while the hydrogenation step employing conventional hydrogenation conditions can be carried out in liquid, vapor, or mixed phase. Autofining temperatures employed are preferably those in the range of about 700–850° F. and hydrogenation conditions are preferably those within the range of about 400–700° F. Autofining pressures are preferably in the range of 50–250 p.s.i., hydrogenation pressure conditions being generally about the same but in some cases somewhat higher than those of the autofining step such as in the range of from about 50–2000 p.s.i.g. The relative space velocities in the hydrogenation and autofining zones are adjusted as required by the use of appropriate quantities of catalysts in the two zones. The liquid space velocity in the hydrogenation zone is preferably within the range of 0.2 to 10 volumes per catalyst volume per hour and the hydrogen flow rate in the hydrogenation zone is generally in the range of from 250–10,000 cubic feet per barrel of feed. The vapor space velocity in the autofining zone is preferably within the range of 1 to 5 volumes per catalyst volume per hour. However, the quantity of off-color or color-unstable kerosene passed to the autofining zone is adjusted to satisfy the hydrogen needs of the hydrogenation reactor. I have found, however, that, when treating off-color kerosenes in accordance with my invention, the volume of ratio of feed to autofining to feed to hydrogenation is advantageously greater than 1:1, preferably in the range of about 2:1 to 4:1, a volume ratio approximately 3:1 being now preferred.

Any suitable autofining catalyst can be employed in the practice of this invention. Thus, metal sulfides and oxides, especially those of the 6th group either alone (e.g. chromium oxide and tungsten sulfide) or in admixture with other sulfides or oxides (e.g. tungsten sulfide and nickel sulfide), or mixed with or deposited on a support such as bauxite, activated alumina or kieselguhr, and natural or processed bauxite, may be used. Preferred catalysts comprise those of the cobalt molybdate type which can be mixtures of the oxides of cobalt and molybdenum or chemical compounds of cobalt molybdenum and oxygen or mixtures of one or both of said oxides with said compounds either alone or incorporated with a support such as alumina.

Any suitable hydrogenation catalyst, sulfactive, can be employed. Such catalyst can be a metal oxide or sulfide such as nickel, tungsten, cobalt or molybdenum used either separately or in combination, alone or with a carrier material such as alumina, silica-alumina, bauxite or kieselguhr. These catalysts are prepared in accordance with methods in the art including coprecipitation, impregnation and the like. The hydrogenation catalysts may also be presulfided before use by treatment with hydrogen sulfide at 700–800° F. for from 3–6 hours or longer. Exemplary of conventional hydrogenation catalysts, employed in the art, are molybdenum trioxide-alumina, molybdenum trioxide-silica alumina, alumina-supported cobalt molybdate, molybdenum disulfide, nickel sulfide-tungsten sulfide, and chromium oxide, vanadium oxide, molybdenum oxide on alumina, and cobalt molybdate catalysts are preferred.

Regeneration of used catalyst in the autofining zone may be carried out by burning off the carbon deposits with a diluted air mixture such as air diluted with steam, or, if desired, with carbon dioxide, nitrogen, or the like. The autofining catalyst can be regenerated when its dehydrogenation activity drops and the hydrogen partial pressure reaches a predetermined level in the hydrogenation reactor, e.g. 50 p.s.i.

Although this invention is applicable to any hydrocarbon material exhibiting color and color stability problems, gasoline fractions, kerosene fractions, and similar burning oils, straight run or cracked, preferably the former, generally those having a boiling range within the limits of 200–600° F. more often 300–500° F., are those generally treated. Such hydrocarbon materials generally contain from about 0.1 to 0.6 weight percent sulfur and may exhibit a Saybolt color as low as about 0 or lower.

In accordance with a now preferred embodiment, illustrated in more detail with reference to the accompanying drawing, a substantially water-white and color stable kerosene is produced from an off-color or color unstable kerosene distillate. Separate streams of the said off-color kerosene, generally split streams, are passed in parallel, one under autofining conditions and one under hydrogenation conditions. A hydrogen-rich stream is separated from the autofining effluent and is passed as sole source of hydrogen to the hydrogenation zone. Resulting liquid effluent from autofining is fractionated to produce from 70–85 percent of its volume of an intermediate fraction as product of improved color and color stability. Effluent form the hydrogenation is separated into a hydrogen-containing stream cycled to the autofining zone, the resulting liquid fraction being then fractionated to produce up to 95 percent of its volume of an intermediate product of improved color and color stability. Preferably, the 70–85 percent cut from autofining and the "up to 95 percent" cut from hydrogenation are blended to produce product exhibiting color quality greater than, and recoverable in yield higher than that of improved color quality product of autofining alone. Although the total effluent from hydrogenation can be recovered in yields as high as 99 volume percent of the liquid product, that portion above 95 volume percent, referred to hereinabove, is disproportionally poor in color quality and is excluded inasmuch as to retain it would be so at the expense of product quality. For the same reason, although autofining reactor effluents are recovered from distillation to produce the 70–85 volume percent fraction referred to, it is preferable that only about 75–80 volume percent of the product be recovered as color stable product. However, I have found that by fractionation of the said liquid effluent from autofining to produce the 70–85 volume percent fraction, quality of the color stable product recovered is not impaired to an extent to require in all cases that the volume not exceed 80 volume percent.

My invention is illustrated with reference to the drawing which is a diagrammatic representation of a now preferred embodiment. With reference to the drawing, an off-color kerosene is charged via line 11 to preheater 10 in admixture with recycled gas from lines 29 and 31 described hereinafter, the resulting admixture being heated to a temperature in the range of about 775–825° F. Resulting hot distillate is then passed into autofining zone 12 by way of line 13. Vapors thus heated pass downwardly through autofining reactor 12 in contact with an autofining catalyst such as cobalt molybdate at a space velocity within a range described hereinabove such as about 2.6 v./v./hr. Effluent vapors are passed from zone 12 by way of heat exchanger or cooler 14 and are separated into two phases in liquid-gas separator 15. Liquid phase in separator 15 which contains desulfurized kerosene is passed by way of line 16 to fractionator 17 and therein separated into an overhead stream containing hydrogen and hydrogen sulfide withdrawn via line 18, an intermediate color and color stable kerosene product withdrawn by way of line 19 as an overhead and a bottoms stream removed by way of line 20. The color stable kerosene distillate stream is recovered in volume so as to contain from 70–85 volume percent of the full range liquid product, i.e., liquid effluent from autofining.

In the autofining of light straight-run feed stocks, such as kerosene herein, there is a considerable excess gas make which contains upwards of 80 mol percent hydrogen. The gas stream is removed from separator 15 by way of line 21 and passed to preheater 22 along with a second, or split, stream of the kerosene in line 11 and the resulting preheated kerosene-hydrogen-containing gas admixture is introduced into hydrogenation chamber 24 by way of line 25. The resulting mixture in line 25 is at a (preheated) temperature of 550–560° F. Charge from line 25 into chamber 24 is passed downwardly over a suitable hydrogenation catalyst therein such as for example molybdenum oxide-alumina at a space velocity in a range described hereinabove such as about 2.6 v./v./hr. Effluents from chamber 24 are removed by way of line 26, cooled in heat exchanger 27 and passed to liquid-gas separator 28 wherein there is separation into two phases. A gas phase is recovered from separator 28 by way of line 29, compressed by compressor 30 and recycled through line 31, referred to hereinabove, to maintain the desired conditions in autofining zone 12. Liquid phase which contains the desulfurized kerosene from chamber 24 is removed from separator 28 by way of line 32 and passed to fractionator 33 for removal of hydrogen sulfide and gases withdrawn through line 34 and vented into line 35 along with off-gases from fractionator 17. A color-stable kerosene distillate is removed from fractionator 33 as an overhead by way of line 36 and constitutes (an intermediate fraction) up to 95 volume percent of the total liquid effluent from hydrogenation chamber 24. Color stable product in line 36 is advantageously combined with that in line 19 and total product of the process is passed to storage by way of line 37. Bottoms product from fractionator 33 is withdrawn by way of line 38, combined with a bottoms product removed from line 20 from fractionator 17 and the total passed via line 39 to storage. The bottoms product from both fractionator 17 and 33 can be used as stove oil, furnace oil or as catalytic cracking charge stock.

Bottoms product in line 20 from fractionator 17 can, if desired, be recycled by way of line 20a to line 25 to hydrogenation in chamber 24. When desired, hydrogen-containing gas from line 29 can be admixed with gas in line 23 by way of line 21a, or vice versa, hydrogen containing gas in line 21 can be admixed with gas in line 29 by way of line 21a.

My invention is further illustrated with reference to Tables I and II. In Table I are data showing the improvement in color and color stability obtained by effecting controlled fractionation of effluent from autofining and conventional hydrogenation. As shown with reference to run A, fractionation of liquid product of conventional hydrogenation had no noticeable adverse effect on color and color stability of the product. Thus raising the percent overhead from 78 to 95 did not reduce the color which was +30. However, by fractionation of liquid autofining product (run B) to obtain only about 78 percent of its volume of an intermediate fraction, as overhead, a marked improvement in color and color stability was obtained, over that of a 95 volume percent intermediate cut overhead. The data of Table I further show that, by fractionating effluent of conventional hydrogenation, excellent color and color stability of an intermediate fraction of 95 percent of the volume of the liquid effluent is obtained as overhead.

Various operating conditions, stream flow rates and properties with reference to the drawings and Table I, are set forth in Table II.

As stated hereinabove, we have found that optimum yields of product of improved color and color stability are obtained when the volume ratio of kerosene charged to autofining, to kerosene charged to hydrogenation, is within a range of 2:1 to 4:1. The selected ratio depends to an appreciable extent on the naphthenic, olefinic and sulfur content of the feed charged to these units. Thus, a feed of low naphthenic content will require a large split to the autofining zone so as to produce sufficient hydrogen for the hydrogenation. I have found that, although the selected ratio does generally fall within the preferred range, i.e., 2:1 to 4:1 above described, ratios outside that range can be advantageously employed, dependent upon the specific stock to be treated.

*Table I*

|  | Kerosene Feed | Hydrogenation Zone | Autofining Zone |
|---|---|---|---|
| Run | | A | B |
| Pressure, p.s.i.g. | | 150 | 150 |
| Temperature, ° F. | | 600 | 775 |
| S.V., v./v./hr. | | 2.6 | 2.6 |
| H₂ rate, c.f./b. | | 2,430 | 2,130 |
| Feed Vol. ratio [1] | | | |

|  |  | Effluent | |
|---|---|---|---|
| Properties: | | | |
| Wt. percent S | 0.226 | 0.112 | 0.032 |
| API gravity | 41.7 | 41.0 | 42.0 |
| Bromine No. | 3.9 | | |
| Aromatics, vol. percent | | | |
| Saybolt color | +9 | +18 | +14 |
| 95 Vol. percent O.H. (Fractionation): | | | |
| Wt. percent S | 0.254 | 0.105 | 0.024 |
| API gravity | 41.8 | 42.2 | 42.3 |
| Bromine No. | 3.8 | 3.0 | 4.2 |
| Aromatics, vol. percent | [3] 19.5 | 17.8 | [3] 19.5 |
| Saybolt color, Months [2]— | | | |
| 0 | +14 | +30 | +26 |
| 2 | | +30 | +25 |
| 6 | | +30 | +22 |
| 5 Vol percent Residue: | | | |
| API gravity | | 37.5 | 35.5 |
| Aromatics, percent | | 22.2 | 30.4 |
| 78 Vol. percent O.H. (from effluent fractionation): | | | |
| Wt. percent S | 0.226 | 0.103 | 0.026 |
| API gravity | 42.7 | 43.0 | 43.2 |
| Bromine No. | | 3.4 | 4.2 |
| Saybolt color, Months [2]— | | | |
| 0 | +14 | +30 | +28 |
| 2 | | +30 | +29 |
| 6 | | +30 | +26 |

[1] Autofining: Hydrogenation.
[2] Dark, vented storage.
[3] Believed high due to inherent error in analytical procedure.

*Table II*

[Total kerosene charge +1000 b./d.]

AUTOFINING (Chamber 12) [2]

| Stream | Rate | Stream No. (see Drawing) |
|---|---|---|
| Kerosene charge [1] | 741.5 b./d | 13 |
| Kerosene O.H. Product (78 vol. percent) [1] | 578.5 b./d | 19 |
| Stove oil, etc. (22 vol. percent) | 163.0 b./d | 20 |
| Net H₂ production | 8,160 c.f./d | |
| H₂S production | 4,574 c.f./d | |
| Vent gas—H₂ | 3,560 c.f./d | 18 |
| Vent gas—H₂S | 4,570 c.f./d | 18 |

HYDROGENATION (Chamber 24) [2]

| Stream | Rate | Stream No. |
|---|---|---|
| Kerosene charge [1] | 258.5 b./d | 25 |
| Kero. O.H. product (95 vol. percent) [1] | 245.5 b./d | 36 |
| Fractionator Btms. (5 vol. percent) [1] | 13 b./d | 38 |
| H₂ consumed | 3,360 c.f./d | |
| H₂S production | 936 c.f./d | |
| Vent gas—H₂ | 1,240 c.f./d | 34 |
| Vent gas—H₂S | 940 c.f./d | 34 |

TOTAL EFFLUENT

| Stream | Rate | Stream No. |
|---|---|---|
| Kerosene product | 824 b./d. (API 42.9) | 37 |
| Stove oil, etc | 176 b./d. (API 35.6) | 39 |
| Hydrogenation Chamber 24 | 13 b./d. (API 37.5) | |
| Autofining Chamber 12 | 163 b./d. (API 35.5) | |
| Hydrogen | 4,800 c.f./d | 35 |
| H₂S | 5,510 c.f./d | 35 |
| Recycle gas | 1,483 mc.f./d | 29 |
| H₂-containing gas | 1,487.6 mc.f./d | 21 |

[1] See Table I for properties.
[2] See Table I for operating conditions.

*Table III*

The following is a tabulation of selected data mostly from the foregoing Tables I and II demonstrating that by the present invention higher yield and higher color quality product are obtained than when employing autofining alone and that by my combination of treating steps hydrogen from autofining, employed as sole hydrogen source for hydrogenation, provides for an equivalent of increased autofining yield and quality.

|  | Autofining—78 percent O.H. From Fractionation | Hydrogenation—95 percent O.H. From Fractionation | Total (Each Fractionation) |
| --- | --- | --- | --- |
| b./d. | 578.5 | 245.5 | 824. |
| API | 43.2 | 42.2 | 42.9 |
| Wt Percent S | 0.026 | 0.105 | 0.050 |
| Bromine No. | 4.2 | 3.0 | 3.9 |
| Saybolt color, Months: [1] |  |  |  |
| 0 | +28 | +30 | +29 |
| 2 | +29 | +30 | +29 |
| 6 | +26 | +30 | +27 |
| Stove Oil, Furnace Oil, or Cracking stock: |  |  |  |
| b./d. | 163 | 13 | 176 |
| API | 35.5 | 37.5 | 35.6 |

[1] Dark, vented storage.

Thus with knowledge of feed rate to each zone, taken from Table II, it can be shown by simple calculations, using information from Table III, that the yield of color-stable kerosene is greater from the process of the invention than from autofining alone. Also, from Tables I and II it can be calculated that the product of the invention has a sulfur content of 0.049 percent which compares very favorably with autofining product and is considerably better than that of hydrogenation alone.

My invention provides for production of improved color and color stable product in higher yield and having color quality, i.e., better color and greater color stability, than is obtainable by autofining alone. Thus, see Table I, when autofining a kerosene stream, from 70–85 volume percent of the liquid product fraction is recovered as color-stable product, whereas that portion of the stream treated in the hydrogenation step is recovered in 95 volume percent of the liquid product providing an overall increase thereby in high color quality product recovered; and the liquid product fraction recovered in a volume up to 95 volume percent of the liquid from hydrogenation is of somewhat higher color quality than that of the 70–85 volume percent fraction from autofining; the net result being a combined improved color quality product in higher yield than obtained by autofining alone.

Hydrogen for use during the hydrogenation is supplied, as sole source therefor, from the autofining step and is thereby utilized by the combination of this invention to provide the equivalent of an increased autofining yield.

Still another advantage of this invention is that that portion of the off-color charge material passed through the hydrogenation step is treated at a markedly lower temperature than that of autofining so that, overall, a lower average temperature is employed providing thereby for markedly lowered process and equipment requirements.

When treating a kerosene stock containing from about 0.1 to 0.6 weight percent sulfur, in accordance with this invention, the 70–85 percent overhead product from autofining, described hereinabove, has a Saybolt color above about +28 and after storage of about six months, the color is not less than +26, and the "up to 95 percent" fraction from hydrogenation, described hereinabove, has a Saybolt color above about +30 and after storage of about six months the color is not less than about +30.

Reasonable variation and modification are possible within the scope of the foregoing disclosure, the drawings, and the appended claims to the invention, the essence of which is that a process has been provided for improving color and color stability of hydrocarbons, preferably hydrocarbon distillates boiling in the kerosene range, by treating separate streams of such a material, e.g., by splitting a single stream thereof, autofining a first of the said streams, hydrogenating a second of the said streams, recovering hydrogen from the said autofining and passing same to the said hydrogenation as sole source of hydrogen therefor, and recovering hydrocarbon product of improved color and color stability from effluent from the said autofining and hydrogenation steps; it being a feature of this invention that effluent from autofining is fractionated to produce from 70–85 percent of its volume of an intermediate liquid fraction, and effluent from hydrogenation is fractionated to produce up to 95 percent of its volume of an intermediate fraction, the combined intermediate fractions exhibiting color quality greater than, and being recoverable in yields higher than, that obtainable by autofining alone and being formed under average reaction temperature conditions less severe than when employing autofining alone; hydrogen from autofining being the sole source of hydrogen for hydrogenation and thereby providing the equivalent of an increased autofining yield; all as described herein.

I claim:

1. A process for improving color and color stability of an off color sulfur-bearing hydrocarbon distillate comprising, dividing said distillate into a first stream and a second stream boiling within the same boiling point range, passing said first stream of said distillate in contact with an autofining catalyst under autofining conditions, passing said second stream of said distillate in contact with a hydrogenation catalyst under hydrogenation conditions, fractionating the effluent from said autofining into a hydrogen-containing fraction and a residual liquid fraction, passing said hydrogen-containing fraction to said hydrogenation as sole hydrogen source therefor, fractionating the residual liquid from said fractionation of said autofining to produce from 70–85 percent of its volume of an intermediate fraction, fractionating the effluent from said hydrogenation to produce up to 95 percent of its volume of an intermediate fraction, combining said intermediate fractions, and recovering said combined intermediate fractions as product of the process.

2. A process of claim 1 wherein said hydrocarbon distillate has a boiling range within the limits of 200–600° F.

3. A process for improving color and color stability of an off-color sulfur-containing kerosene distillate comprising splitting a stream of said kerosene into a first and second stream, passing said first stream in contact with an autofining catalyst under autofining conditions, passing said second stream in contact with a sulfactive hydrogenation catalyst under hydrogenation conditions, passing effluent from the zone of said autofining catalyst to a first fractionation zone and therein fractionating same into a hydrogen-containing overhead fraction and a residual liquid fraction, passing effluent from the zone of said hydrogenation catalyst to a second fractionation zone and therein fractionating same into a hydrogen-containing overhead fraction and residual liquid fraction, passing said hydrogen-containing fraction from said autofining, separated in said first fractionation zone, to said hydrogenation as sole source of hydrogen therefor, passing residual liquid from said autofining, separated in said first fractionation zone, to a third fractionation zone and therein fractionating same into a hydrogen-containing overhead fraction, a residual fraction and from 70–85 percent of its volume of an intermediate fraction, passing residual liquid from said hydrogenation, separated in said second fractionation zone, to a fourth fractionation zone and therein fractionating same into a hydrogen-containing overhead fraction, a residual fraction and up to 95 percent of its volume of an intermediate fraction, and recovering a combined stream of said intermediate fractions as product of the process.

4. A process of claim 3 wherein said autofining catalyst is a cobalt molybdate and said hydrogenation catalyst is a catalyst selected from the group consisting of vanadium oxide, molybdenum oxide on alumina, and cobalt molybdate.

5. A process of claim 3 wherein said hydrogen-containing fraction, separated in said second fractionation zone, is recycled to the zone of said autofining.

6. A process of claim 3 wherein at least a portion of said residual fraction from said autofining, separated in said third fractionation zone is cycled to the zone of said hydrogenation.

7. A process of claim 3 wherein said kerosene split streams contain from about 0.1 to about 0.6 weight percent sulfur have an initial color of from about 0 to +15; said autofining catalyst is a cobalt molybdate; said hydrogenation catalyst is at least one of the group of vanadium oxide, molybdenum oxide on alumina, and cobalt molybdate; said autofining is effected at a temperature in the range of from about 700 to 850° F. at a space velocity of from about 1 to about 5 vapor volumes of kerosene feed per volume of catalyst per hour, said hydrogenation is effected at a temperature in the range of from about 400 to about 700° F. at a space velocity of from about 2 to about 10 liquid volumes per volume of catalyst per hour, said intermediate fraction recovered from said autofining has a color in the range of from about +27 to about +29 and is not less than about +26 at the end of about six months standing, and said intermediate fraction recovered from hydrogenation has the color of from about +29 to about +30 and is not less than about +29 at the end of about six months standing.

8. A process of claim 3 wherein the volume ratio of said first kerosene stream to said second kerosene stream is in the range of from about 2:1 to about 4:1.

9. A process of claim 8 wherein said ratio is about 3:1.

References Cited in the file of this patent
UNITED STATES PATENTS

| | | |
|---|---|---|
| 2,672,433 | Porter et al. | Mar. 16, 1954 |
| 2,719,108 | Porter | Sept. 27, 1955 |

UNITED STATES PATENT OFFICE
Certificate of Correction

Patent No. 2,880,166 March 31, 1959

Reagan T. Wilson

It is hereby certified that error appears in the printed specification of the above numbered patent requiring correction and that the said Letters Patent should read as corrected below.

Column 2, line 40, for "second", second occurrence, read —said—; column 4, line 14, for "form" read —from—; column 6, line 36, in the heading of Table II, for "[Total kerosene charge+1000 b./d.]" read —[Total kerosene charge=1000 b./d.]—; column 7, line 34, before "color", first occurrence, insert —a higher—.

Signed and sealed this 18th day of August 1959.

[SEAL]

Attest:
KARL H. AXLINE,
*Attesting Officer.*

ROBERT C. WATSON,
*Commissioner of Patents.*